July 10, 1962  P. J. GARDNER  3,043,466

CONTAINERS FOR CRYOGENIC LIQUIDS AND GASES

Filed July 13, 1961

INVENTOR
PAUL J. GARDNER
BY
*Grover G. Frater*
ATTORNEY

… … … … …

United States Patent Office 3,043,466
Patented July 10, 1962

3,043,466
CONTAINERS FOR CRYOGENIC LIQUIDS
AND GASES
Paul J. Gardner, Davenport, Iowa, assignor to The Bendix Corporation, Davenport, Iowa, a corporation of Delaware
Filed July 13, 1961, Ser. No. 123,771
3 Claims. (Cl. 220—14)

This invention relates to improvements in containers for cryogenic liquids and gases.

Among the objects of the invention is the provision of a container having improved resistance to vibration damage, low heat loss characteristics and which is smaller for a given capacity and is readily manufactured. These and other objects and advantages of the invention which will hereinafter be apparent are realized in part by the provision of a container comprising inner and outer spaced vessels, having an interconnecting conduit at each end region at least partially encircling the inner vessel and spacing means associated with each conduit to separate the vessels from one another and from the conduits.

In another phase of the invention, the contraction of the container elements at cryogenic temperatures, defined as temperatures below those ordinarily occurring in nature or about minus 75 degrees Fahrenheit, is utilized to modify the suspension of the inner container to reduce heat loss.

One embodiment of the invention is shown in the accompanying drawing. Various modifications of this embodiment and other embodiments are possible without departure from the spirit of the invention and the scope of the appended claims.

Figure 1:
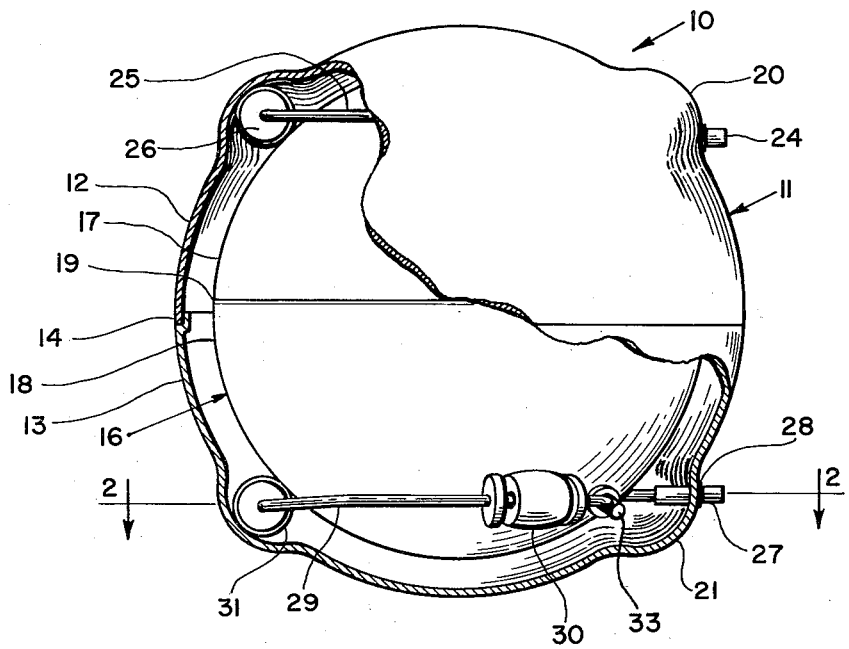
Figure 2:
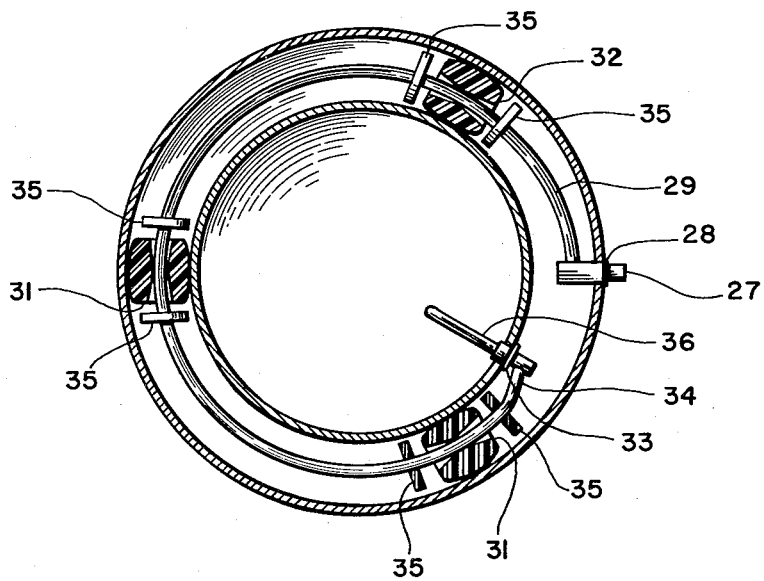

FIG. 1 is a view in side elevation, partly in section of a container embodying the invention; and FIG. 2 is a sectional view taken on line 2—2 of FIG. 1.

In the invention, the container comprises an inner vessel having at least two openings, one at or near each of its ends, usually the top and bottom, and called "ends" herein. An outer vessel surrounds and is spaced from the inner vessel. It too is formed with at least two openings at or near its ends. Means in the form of a conduit are provided for connecting the openings at corresponding ends of the inner and outer vessels to provide communication from the exterior of the container to the interior of the inner vessel through, but not to, the space between the vessels. This space is heat insulated by insertion of insulation material or by evacuation.

The vessels may have various shapes except that associated or corresponding end portions at each end of both vessels are formed so that their cross sectional dimension decreased toward the vessel ends whereby spacers inserted between such portions of the vessels will, except as hereinafter described, prevent substantial relative motion between the two vessels. Vessels having tapered or rounded ends or having peripherial recesses or bulges have the required shape.

Each conduit, which advantageously comprises a tube, is connected at one end to the inner container at one of its openings and extends, if the opening is not located there, to the space between the described end portions of the vessels where it is formed to extend more than half way around the inner vessel and then is connected to the outer vessel at its corresponding opening. Insulating spacing means are provided to hold the vessels separated from one another, and except at the end connections, from the conduits. In addition, the spacing means serve to prevent substantial relative motion between the vessels.

In a preferred form of the invention, the spacers have dimensions large enough so that they engage both the inner and outer vessel at room temperature but small enough so that not all of the spacers can engage both vessels when the inner container, and the spacers, contract, as an incident to being cooled to cryogenic temperatures. In practice, the inner container is so cooled only when it contains cryogenic liquid. Then the combined weight of the contracted inner vessel and liquid will cause the inner vessel to bear down upon the spaces between its lower end and the lower end of the outer vessel. As an incident to this action the spacers between the upper ends of the vessels will become disengaged from one vessel or the other to interrupt the heat path that would otherwise extend from the outer vessel through the spacer to the inner vessel.

In this preferred form of the invention the inner vessel is fully supported against harmful vibration when the inner vessel is empty and warm. When the inner vessel contains liquid which by its own weight helps prevent excessive vibration in certain modes whereby not all the spacers are required, certain of the spacers break contact with one container or the other to reduce what has then become a major problem, reduction of heat input to the inner container. Of course these spacers are still effective to prevent excessive relative movement of the vessels in the case of shock and large amplitude vibration.

The invention is not without special advantage even if none of the spacers break contact with one of the vessels as the inner one is cooled. Heat loss will be reduced even if the area engaged by the spacer of one vessel or the other is reduced or if the force of the contact between the spacers and the vessels is diminished as an incident to contraction of the inner bottle and spacers.

Because of small dimensional variations in manufacture, it is advantageous to form the spacers of a material having some resilience and formed slightly oversized to insure both engagement by the spacer of both vessel and that the parts of the outer vessel can be fitted together properly during manufacture. Such plastic materials such as trifluorochloroethylene and tetrafluoroethylene, while not the only suitable materials, are recommended for use in the spacers. Advantageously, the spacer is formed with a surface having a shape other than that of the container so that the area of engagement will diminish as compression of the spacer is reduced.

In the illustrated embodiment of the invention, the container is designated generally by the numeral 10. It comprises a stainless steel outer vessel 11 formed of an upper end 12 and a lower end 13 suitably joined, as by welding at 14. It further comprises a stainless steel inner vessel 16 formed of an upper end 17 and a lower end 18 which are suitably joined, again as by welding, at 19. Both vessels are substantially spherical; the outer vessel differs from a sphere in that it is provided with annular bulges 20 and 21 at about the midplane of its upper and lower halves, respectively. In terms of previous container constructions, the outer shell has a reduced spherical radius except in these annular regions so that the container can be fitted into a space of smaller length, width, and height than previous containers of equal capacity. This feature of the invention has especially practical significance in liquid-to-gas conversion systems for aircraft and space vehicles.

Both vessels are provided with openings at their upper and lower ends. These openings are connected by a tube which extends from a fitting in the opening of the inner vessel, around the inner vessel within the bulged portion to a fitting in the opening of the outer vessel. The vessels, fittings, and tubing are secured and sealed together by any suitable means, here by welding and silver soldering, to provide communication from the interior of the inner bottle to the exterior of the container while preserving evacuation of the inner vessel space. In the embodiment shown, the conduits lie substantially parallel to and equidistant from a median plane of the container lying between them. Certain of these elements are shown in the drawing. They are the upper outer fitting 24, upper tube 25, one upper spacer 26, lower outer fitting 27, lower outer opening 28, lower tube 29, lower spacers 30, 31, and 32, lower inner fitting 33 and lower inner opening 34. The spacers are retained in position by retaining rings 35 which are fastened to and encircle the tubes. In FIG. 2 the tube 36 is open at one end and is secured at its other end to lower inner fitting 33. This tube is functionally an extension of lower tube 29 to provide communication direct to the bottom region of the inner vessel. Except for tube 36, the lower tube, spacer and fitting assembly is like the upper assembly.

The spacers are made of tetrafluoroethylene. As best shown in FIG. 2 they are generally elliptic, with a surface curved more than the vessel surfaces, and have a bore through which the associated tube extends. The bore is tapered to a somewhat reduced diameter in the central region to reduce the surface area over which it contacts the tube. It fits on the tube rather loosely, advantageously to permit spacer rotation on the tube during vibration, but not so loosely that appreciable tube vibration is permitted. In this embodiment, because the spacers fit loosely on the tubes, the tubes alone adsorb and substantially prevent relative rotational vibration between the inner and outer vessels. The dimensions of the spacers are such that they contact both vessels and are slightly compressed when the container is assembled at ordinary temperature. Advantageously three upper and three lower spacers are employed substantially equally spaced along their respective tubes each of which extends almost all the way around the inner vessel.

In operation of the container shown, when it contains cryogenic liquid and begins to cool, the inner vessel contracts and its radius is reduced. The inner vessel settles downwardly partly because of the weight of the liquid and partly because of its contraction. It is supported by the lower spacers which continue to contact both the inner and outer vessels. In this action the pressure on the upper spacers is diminished and the area of contact is decreased to reduce the heat input path. If the cryogenic liquid is sufficiently cold or sufficiently cold and heavy, as in the cases of liquid hydrogen and liquid oxygen, the upper spacers will break contact slightly with one or the other of the vessels to break the heat path.

It is another advantage of the invention that the container can be mounted on its side. Thus the container shown in the drawing could be mounted such that its tubes 25 and 29 are disposed in substantially vertical planes. When so mounted the position of the openings would be selected so that the inner openings communicated one with the gas phase and the other with the liquid phase of the inner vessel as they do in the drawing.

I claim:

1. A container for cryogenic fluids comprising inner and outer spaced vessels, each having opposite end portions diminishing in cross sectional area toward their ends, concentrically arranged, a pair of conduits disposed one between each of the associated end portions of said vessels, each of said conduits having one end connected to the inner vessel and communicating with its interior and each extending more than half way around said inner vessel substantially in the plane of its respectively associated end portions of said vessels and there being connected to said outer vessel and communicating with its exterior, a plurality of heat insulating separating spacers, each disposed between an associated one of said conduits and the end portions of the inner and outer vessels, said spacers having dimensions to engage an area of both vessels at one temperature and to engage a lesser area of at least one of said vessels at a lower temperature.

2. The invention defined in claim 1 in which the spacing between said vessels is less over the portions of said vessels other than said end portions than said dimension of said spacers.

3. A container for cryogenic fluids comprising an inner vessel, an outer vessel defining an insulation space between said inner and outer vessels, said vessels each having generally spherical portions on opposite sides of a median line of the container, and mounting means for maintaining said inner vessel spaced from the outer vessel comprising a pair of conduits each connected at one end to said outer vessel and extending between said inner and outer vessel more than half way around said inner vessel and connected at an opposite end to said inner vessel, said conduits being disposed in substantially parallel planes on opposite sides respectively of said median line, a plurality of heat insulating spacers carried by each of said conduits at spaced points, said spacers having dimensions at room temperature such that said spacers engage both said inner and said other vessels and such that certain of said spacers are disengaged from at least one of said vessels when the inner container contracts as an incident to being cooled to a cryogenic temperature.

No references cited.